United States Patent [19]

Deeba et al.

[11] Patent Number: 5,849,256
[45] Date of Patent: Dec. 15, 1998

[54] METHOD FOR OXIDIZING CARBON MONOXIDE IN A GAS STREAM CONTAINING OXIDIZABLE SULPHUR COMPOUNDS

[75] Inventors: Michel Deeba, North Brunswick; Barry K. Speronello, Montgomery Township, Somerset County, both of N.J.

[73] Assignee: Engelhard Corporation, Iselin, N.J.

[21] Appl. No.: 638,413

[22] Filed: Apr. 26, 1996

[51] Int. Cl.[6] .................... B01D 53/62; B01D 53/94
[52] U.S. Cl. ................. 423/247; 423/213.5; 423/246
[58] Field of Search .................... 423/213.5, 247, 423/246

[56] References Cited

U.S. PATENT DOCUMENTS

| | | | |
|---|---|---|---|
| 1,683,694 | 9/1928 | Patrick et al. | 423/522 |
| 2,200,522 | 5/1940 | Streicher | 23/234 |
| 2,364,949 | 12/1944 | Connolly | 196/52 |
| 2,408,396 | 10/1946 | Horsley | 252/250 |
| 2,708,187 | 5/1955 | Kearby | 252/442 |
| 3,067,127 | 12/1962 | Plank et al. | 208/110 |
| 3,068,169 | 12/1962 | Eastwood et al. | 208/134 |
| 3,159,569 | 12/1964 | Hansford | 208/110 |
| 3,226,320 | 12/1965 | Meuly et al. | 210/63 |
| 3,615,166 | 10/1971 | Hindin et al. | 23/2 E |
| 3,840,471 | 10/1974 | Acres | 423/213.5 |
| 3,867,313 | 2/1975 | Brewer | 252/465 |
| 3,873,469 | 3/1975 | Foster et al. | 252/455 R |
| 3,894,965 | 7/1975 | Foster et al. | 252/460 |
| 3,909,452 | 9/1975 | Acres | 252/455 R |
| 4,039,478 | 8/1977 | Cull et al. | 252/455 R |
| 4,080,286 | 3/1978 | Yanik et al. | 208/216 |
| 4,092,404 | 5/1978 | Hass | 423/539 |
| 4,111,848 | 9/1978 | Torii et al. | 252/466 PT |
| 4,171,289 | 10/1979 | Wheelock | 252/466 PT |
| 4,176,089 | 11/1979 | Cull | 252/452 |
| 4,178,270 | 12/1979 | Fujita et al. | 252/447 |
| 4,189,405 | 2/1980 | Knapton et al. | 252/462 |
| 4,191,733 | 3/1980 | Swift et al. | 423/245 |
| 4,221,768 | 9/1980 | Inoue et al. | 423/239 |
| 4,233,276 | 11/1980 | D'Souza et al. | 423/230 |
| 4,240,933 | 12/1980 | Copelin | 252/455 R |
| 4,289,737 | 9/1981 | Acres et al. | 423/245 |
| 4,292,288 | 9/1981 | Gladrow | 423/247 |
| 4,350,670 | 9/1982 | Matsuda et al. | 423/244 |
| 4,399,112 | 8/1983 | Voirin | 423/230 |
| 4,427,576 | 1/1984 | Dupin | 502/218 |
| 4,459,372 | 7/1984 | Arena | 502/351 |
| 4,460,553 | 7/1984 | Deschamps et al. | 423/219 |
| 4,465,889 | 8/1984 | Anthony et al. | 585/640 |
| 4,499,209 | 2/1985 | Hoek et al. | 518/707 |
| 4,505,880 | 3/1985 | Deschamps et al. | 423/219 |
| 4,537,873 | 8/1985 | Kato et al. | 502/242 |
| 4,751,005 | 6/1988 | Mitsui et al. | 210/759 |
| 4,759,918 | 7/1988 | Homeier et al. | 423/213.5 |
| 4,929,586 | 5/1990 | Hegedus et al. | 502/217 |
| 4,937,058 | 6/1990 | Dupin et al. | 423/224 |
| 5,049,364 | 9/1991 | Yoshimoto et al. | 423/239 |
| 5,061,464 | 10/1991 | Cordonna, Jr. et al. | 423/213.5 |
| 5,145,657 | 9/1992 | Kobayashi et al. | 423/219 |
| 5,145,825 | 9/1992 | Deeba et al. | 502/242 |
| 5,176,897 | 1/1993 | Lester | 423/659 |
| 5,208,203 | 5/1993 | Horiuchi et al. | 502/302 |
| 5,292,991 | 3/1994 | Lachman et al. | 585/850 |
| 5,382,416 | 1/1995 | Nakano et al. | 423/213.2 |

FOREIGN PATENT DOCUMENTS

| | | | |
|---|---|---|---|
| 257983 | 3/1988 | European Pat. Off. | |
| 0291704 | 11/1988 | European Pat. Off. | 423/215.5 |
| 2416753 | 10/1975 | Germany. | |
| 53-108891 | 9/1978 | Japan | 423/247 |
| 9310886 | 6/1993 | WIPO | 423/247 |

OTHER PUBLICATIONS

Pope et al "Evaluation of Platinum–Honeycomb Catalysts . . . In Air" Atmospheric Environment vol. 12, pp. 1921–1927; Pergamon Press 1978 (No Month), G.B.

Pope et al "Evaluation of Cobalt Oxide Catalysts . . . In Air" Atmospheric Environment vol. 10. pp. 951–956, Pergamon Press 1976 (No Month) G.B.

Speronello et al, "Family of Versatile Catalyst Technologies for $NO_x$ and CO Removal in Co–Generation" Paper No. 92–109–06, pp. 1–10, Air and Waste Management Assn., Pittsburgh, Pa. (1992). No Month.

Chen et al, "Sulfur Resistant Character of Titania—Supported Platinum Catalysts", Applied Catalysis, 63(1), pp. 107–115(1990). No Month.

"Gas Purification" by Kohl et al., 4th ed. Gulf Publishing Co. Houston TX, USA, (1985), p. 409.

*Primary Examiner*—Gary P. Straub
*Assistant Examiner*—Timothy C. Vanoy

[57] ABSTRACT

A method for oxidizing carbon monoxide in a waste gas stream that also contains sulfur dioxide is carried out by contacting the waste gas stream under oxidizing conditions with an oxidation catalyst which is effective for promoting the oxidation of carbon monoxide but produces less sulfur trioxide from the sulfur dioxide. The catalyst according to the invention contains platinum dispersed on a refractory inorganic oxide support material with a $So_3$-inhibiting quantity of a bismuth compound, such as $Bi_2O_3$. The atomic molar ratio of bismuth to platinum is in the range of from about 0.1:1 to 6:1, e.g., 0.5:1 to 3:1, e.g., 1:1.

8 Claims, No Drawings

METHOD FOR OXIDIZING CARBON MONOXIDE IN A GAS STREAM CONTAINING OXIDIZABLE SULPHUR COMPOUNDS

BACKGROUND OF THE INVENTION

1. Field of the Invention

The present invention relates to an oxidation catalyst useful in purifying exhaust and waste gases and, more specifically, to an oxidation catalyst capable of converting carbon monoxide to carbon dioxide in the presence of sulfur compounds such as $SO_2$.

It is well-known that waste gas and exhaust gas streams containing unburned hydrocarbons and carbon monoxide pollutants can be purified by catalytic oxidation of these pollutants to less noxious species, e.g., to carbon dioxide and water. This is accomplished by contacting the gas stream with an oxidation catalyst. One class of conventional oxidation catalysts includes catalytic materials that comprise one or more platinum group metals dispersed on a particulate refractory inorganic oxide support material such as particulate alumina. The catalytic material may be disposed in a catalyst bed or coated onto a carrier such as a ceramic honeycomb. While such catalysts are effective for oxidizing unburned hydrocarbons and carbon monoxide to less noxious species, they also oxidize sulfur compounds, notably $SO_2$, to $SO_3$, which is considered to be environmentally undesirable. For example, in the treatment of diesel engine exhaust and in the treatment of effluent from stationary sources, the presence of $SO_3$ is associated with elevated formation of particulates.

2. Related Art

U.S. Pat. No. 5,145,825 to Deeba et al, dated Sep. 8, 1992, discloses an oxidation catalyst that resists degradation upon exposure to sulfur oxides and which comprises a Group VIII precious metal, e.g., platinum, palladium and/or rhodium, dispersed on refractory silica particles which have been coated with titania, zirconia or mixtures thereof. The catalyst is described as being useful in oxidizing $SO_2$ to $SO_3$.

U.S. Pat. No. 4,937,058 to Dupin et al, dated Jun. 26, 1990, discloses catalytic materials for treating $H_2S$ and organo-sulfur compounds.

U.S. Pat. No. 5,061,464 to Cordonna, Jr. et al, dated Oct. 29, 1991, discloses a sulfur-tolerant platinum group metal catalyst in which the platinum group metal is dispersed on a support material that may comprise silica, zirconia, titania, zeolite and/or low surface area alpha-phase alumina. The catalyst is used for the removal of carbon monoxide and/or hydrocarbons from a gas stream.

Chen et al, in an article titled "Sulfur-Resistant Character of Titania-Supported Platinum Catalysts" published by Elsevier Science Publishers B.V. in 1990, teaches that a catalytic material comprising platinum dispersed on titania was found to be resistant to poisoning by $H_2S$.

It is known in the art to employ vanadia on alumina as a catalyst for the selective oxidation of $H_2S$ to SO2 (see U.S. Pat. No. 4,427,576, to Dupin, dated Jan. 24, 1984, at column 1, line 65 through column 2, line 3, citing U.S. Pat. No. 4,092,404 to Hass, dated May 30, 1978). However, the use of vanadia is undesirable since vanadium compounds are considered to be toxic and therefore pose a health hazard to those who are exposed to them in the preparation of the catalyst material.

SUMMARY OF THE INVENTION

The present invention relates to a method for oxidizing carbon monoxide in a gas stream containing oxidizable sulfur compounds and carbon monoxide with reduced oxidation of $SO_2$ to SO3, by contacting the gas stream under oxidizing conditions with a catalytic material comprising a refractory inorganic oxide support material, a catalytically effective amount of a platinum component dispersed on the support material, and a bismuth component dispersed on the support material in an amount sufficient to inhibit the oxidation of $SO_2$ to $SO_3$. The invention also pertains to the catalyst material used in the aforesaid method.

According to one aspect of the invention, the bismuth component may comprise $Bi_2O_3$. The bismuth component may be present in an amount sufficient to provide a bismuth-to-platinum atomic molar ratio in the range of from about 0.1:1 to 6:1, e.g., from about 0.5:1 to 3:1. In a particular embodiment, the molar ratio may be about 1:1. Alternatively, the catalytic material may comprise at least about 0.1 percent bismuth by weight, for example, from about 0.5 to about 6 percent by weight, or from about 2 to about 4 percent by weight. Optionally, the catalytic material may be substantially free of vanadium.

According to another aspect of the invention, the refractory inorganic oxide support material may be selected from the group consisting of alumina, silica, titanium-treated silica, zirconium-treated silica, titania, zirconia and mixtures thereof.

In a particular embodiment, the invention may be used for the treatment of diesel engine exhaust.

DETAILED DESCRIPTION OF THE INVENTION AND PREFERRED EMBODIMENTS THEREOF

The present invention relates to a catalytic material useful for oxidizing carbon monoxide in combustion waste gas and exhaust gas streams that contain oxidizable sulfur compounds, e.g., $SO_2$, and to the method for treating such gases using the catalytic material described herein. The catalytic material comprises a platinum component and a bismuth component and may optionally be free of $SO_3$-inhibiting amounts of vanadium or vanadium compounds. In other words, the catalytic material of this invention is optionally substantially free of vanadium. When catalytic material of this invention is used to treat a gas stream that contains CO and $SO_2$, the rate at which the $SO_2$ is oxidized to $SO_3$ is lesser than it would be for prior art catalytic materials. This is believed to be the result of combining platinum and bismuth components in the catalytic material and the ability of bismuth to inhibit the oxidation of $SO_2$ to $SO_3$. The gas stream may contain other sulfur compounds that may be oxidized to $SO_2$, but the rate at which the $SO_2$ so produced is oxidized to $SO_3$ will be lower than it would be if the catalytic material lacked the bismuth component of the present invention. The present invention can therefore be used to treat waste streams from stationary sources and diesel exhaust gases with reduced production of $SO_3$. It is desirable to reduce the production of $SO_3$ because $SO_3$ is associated with the production of acid rain. In applications where the gas stream contains unburned hydrocarbons as well as carbon monoxide, e.g., in the treatment of exhaust gases from a diesel engine, a direct relationship between $SO_3$ production and total particulate matter (TPM) in the exhaust has been recognized. Since TPM is a pollutant, the reduction of $SO_3$ formation is helpful in this regard as well.

In some embodiments of the present invention, the presence of a large proportion of bismuth may slightly depress the CO oxidation activity of the platinum. The quantity of bismuth in the catalytic material may therefore be chosen in accordance with the relative concentrations of CO and $SO_2$ in the gas stream being treated. The greater the $SO_2$ content in the gas stream, the greater the tendency for platinum to form $SO_3$; in such instances, greater proportions of bismuth may be preferred. When the $SO_2$ content of the gas stream is decreased, a greater $SO_2$ oxidation rate can be tolerated, so catalytic material having less bismuth may be used, to avoid repressing the oxidation of carbon monoxide.

In catalytic materials of the present invention, the principal catalytic species for promoting the oxidation of carbon monoxide comprises a platinum component. Optionally, one or more other platinum group metals may be used in conjunction with the platinum component. The catalytic species are dispersed on a refractory inorganic oxide support material which, preferably, is resistant to poisoning by sulfur compounds. Typical support materials include alumina, silica, titanium-treated silica, zirconium-treated silica, titania, zirconia, and mixtures thereof. Titanium- and zirconium-treated silica support materials such as those described in the above-mentioned U.S. Pat. No. 5,145,825, the teachings of which are hereby incorporated herein, may be used. Briefly restated, U.S. Pat. No. 5,145,825 teaches that silica particles having a sufficient surface area to be catalytically active, e.g., at least about 10 $m^2/g$, are stabilized by coating the particles with titania or zirconia, or a mixture of the two. The titania and/or zirconia are coated onto the silica particles by preparing a solution of zirconium and/or titanium salts. The solution is then coated onto the particulate silica, which is then dried to deposit the salts thereon. The coated particles are then calcined in an oxygen-containing atmosphere, e.g., air, to convert the salts to oxides. The titania, which is preferably in anatase form, and/or the zirconia generally comprise at least about 5 weight percent of the coated silica particles, preferably about 10 to about 25 percent by weight, although greater percentages are not believed to be detrimental. Coating weights of between about 5 and about 25 weight percent by weight of the support material are believed to provide between about 100 $m^2/g$ of BET surface area to 300 $m^2/g$ of BET surface area.

The platinum component may be dispersed onto the support material in a conventional manner, e.g., by dissolving a platinum salt in a solution and contacting the support particles with the solution. Such salts as platinic acid, platinum-amine complexes, chlorides and nitrates of the platinum may be employed in preparing the salt solution for impregnation into the support material. The wetted particles are then dried and calcined in air to deposit platinum component on the support particles. Optionally, other platinum group metals may supplement the platinum for use in the oxidative catalysts of the present invention, such as palladium, rhodium, and mixtures thereof, and may be dispersed on the support material in the same manner as the platinum. The catalytically active metals may be applied to the support material in any quantity that yields the desired degree of oxidation of pollutants by the finished catalyst. Typical loadings of platinum group metals on support particles run from about 0.2 to about 6 percent by weight of the catalytic material including the weight of the platinum group metals, preferably 1 to 3 percent, e.g., 2 percent. A loading of at least about 0.2 percent is believed to yield oxidation conversion activity at a level of minimum effectiveness. A loading of at least about 1 percent by weight is more likely to yield adequate performance, while a 2 percent loading is typical and is believed to be adequate in many instances. A loading of 3 percent is appropriate to assure adequate conversion during periods of high CO output and a loading of 6 percent is believed to be appropriate for treatment of gas streams having regularly high CO output. These loading limits may be observed in any desired combination, e.g., 0.2 to 1, 0.2 to 3, 1 to 2, etc., in preparing catalytic materials in accordance with the present invention.

In addition to the aforesaid platinum component, the catalytic material according to the present invention comprises a bismuth component deposited on the support material. Like the platinum component, the bismuth component may be deposited on the support particles in a conventional manner. For example, a solution of a bismuth salt such as bismuth nitrate ($Bi(NO_3)_3$) may be prepared and then applied to a powder comprising the support material particles. The wetted powder is then dried and calcined in the presence of oxygen to convert the bismuth salt compound on the support material to one or more bismuth oxides, designated $BiO_x$, e.g., BiO and/or $Bi_2O_3$. It has been found that the presence of such a bismuth component reduces the tendency of the catalytic material to promote the oxidation of $SO_2$ to $SO_3$. Bismuth oxide has thus been demonstrated to be an effective substitute for vanadia to inhibit the oxidation of $SO_2$ to $SO_3$ in a platinum group metal containing oxidation catalyst, and provides an advantage over vanadia in that bismuth oxide is not a toxic compound. However, vanadia may be employed with the bismuth oxide, if desired.

The bismuth component is added to the support material in an amount that yields sufficient bismuth oxide to produce the desired $SO_3$ inhibitory effect. Typically, catalysts according to the present invention comprise enough bismuth to provide an atomic molar ratio of Bi:Pt in the range of 0.1:1 to 6:1, e.g., from about 0.5:1 to 3:1. An atomic molar ratio of 0.1:1 is expected to provide a minimum degree of inhibition of $SO_3$ formation; an atomic molar ratio of 0.5:1 is more suitable for many gas streams. An atomic molar ratio of 3:1 is suitable for gas streams having a constant content of $SO_2$ or other oxidizable sulfur species, whereas an atomic molar ratio of 6:1 provides maximum inhibition of $SO_3$ formation, and is suitable for gas streams having higher-than-average sulfur content. These atomic ratios may be observed in any desired combination, e.g., 0.1:1 to 0.5:1; 0.1:1 to 3:1, etc., in producing catalytic materials according to the present invention. Alternatively, the catalytic material may comprise at least about 2 percent by weight bismuth, for example, the catalyst may comprise from about 2 to about 4 percent by weight bismuth in the form of one or more bismuth oxides by weight of the finished catalytic material. The catalytic material may be disposed in the form of a catalyst bed, or it may be formed into a washcoat slurry and coated onto a carrier such as a cordierite honeycomb, in a conventional manner. A gas stream containing carbon monoxide and $SO_2$ can then be flowed in contact with the catalytic material to achieve catalytic oxidation of the carbon monoxide with reduced conversion of $SO_2$ to $SO_3$. As indicated below, the catalytic material of the present invention is also believed to be effective for the oxidation of unburned hydrocarbons.

EXAMPLE 1

A. Preparation Of Support Material

A zirconia-treated silica support material was prepared from 200 g of calcined silica obtained from Davison Division of WR Grace Corporation under the commercial designation Syloid 74. The silica was then wetted with 250 ml of a solution containing 161 g of zirconium nitrate. The wetted silica was then dried at 100° C. and calcined at 750° C. for 2 hours, producing a $ZrO_2$-$Sio_2$ support material comprising 25 percent by weight zirconia.

B. Preparation Of Experimental Catalyst Member E-1

Six grams of bismuth nitrate $Bi(NO_3)_3$ was dissolved in water to yield 125 ml of solution. One hundred grams of the $ZrO_2$-$SiO_2$ support material prepared in part A above was impregnated with the bismuth nitrate solution, dried and calcined at 540° C. The material was then impregnated with 125 ml of a solution containing 15.7 g of platinumammine-hydroxide salt, dried and calcined, resulting in a catalytic material comprising 2 percent platinum by weight. The finished Pt/Bi/$ZrO_2$-$SiO_2$ catalytic material was formed into a slurry and applied as a washcoat onto a cordierite honeycomb having 200 cells per square inch (cpsi) and measuring 3 inches in length and 1.5 inches in diameter, at a loading of 1.2 g/in$^3$ (dry basis). The coated honeycomb carrier was then calcined at 540° C. The catalytic material on the finished catalyst member comprised bismuth in a 1:1 atomic molar ratio with platinum. This catalyst member was designated E-1.

C. Preparation Of Reference Catalyst Member R-1

A reference catalyst member was prepared in accordance with the procedure described above in Part B, except that no bismuth component was added to the catalyst member. The resulting catalyst member was designated R-1.

D. Test

Catalyst member E-1 and catalyst member R-1 were tested in a flow reactor using a test stream comprising about 85 ppm carbon monoxide, 80 ppm $SO_2$, 10 mole percent oxygen and 10 mole percent steam at 115,000/hr GHSV (Gas Hourly Space Velocity) This test stream was designated gas stream "A". The catalyst members were also exposed to a second gas stream having the same composition as stream A except for an additional 254 ppm CO for a total of about 339 ppm CO. The second test gas stream was designated gas stream "B".

Catalyst members E-1 and R-1 were exposed to both test streams A and B at two different temperatures. The composition of the effluent gas was evaluated, and the conversion rates for $SO_2$ to $SO_3$ were measured and recorded. The conversion rate for CO to $CO_2$ was measured and recorded with respect to gas stream B. The results are set forth in TABLE I.

TABLE I

| Bi:Pt Atomic Ratio | Temp. | Gas | Percent Conversion $SO_2$ | CO |
|---|---|---|---|---|
| E-1 1:1 | 333° C. | A | 7.4 | >90 |
| R-1 None | 330° C. | A | 28.8 | >90 |
| E-1 1:1 | 352° C. | A | 12.3 | >90 |
| R-1 None | 354° C. | A | 46.0 | >90 |
| E-1 1:1 | 331° C. | B | 15.4 | 92.4 |
| R-1 None | 330° C. | B | 42.9 | 94.6 |
| E-1 1:1 | 352° C. | B | 20.0 | 92.6 |
| R-1 None | 349° C. | B | 46.9 | 94.6 |

The data of TABLE I show that the bismuth-containing catalyst member E-1 exhibited a significantly lower rate of conversion of $SO_2$ to $SO_3$ than the reference catalyst member R-1. The data also show, with respect to gas stream B, that the rate of conversion of CO to $CO_2$ for catalyst member E-1 was comparable to that of R-1. Such CO conversion activity indicates that the catalytic material is likely to be effective for the oxidation of hydrocarbons as well. The inhibition of $SO_3$ formation by catalyst member E-1 was greater in each of the higher temperature tests than in the corresponding lower temperature tests.

EXAMPLE 2

Four cordierite honeycomb carriers measuring 3 inches in length and 1.5 inches in diameter, were immersed in a slurry of the conventional catalytic material comprising platinum dispersed on an alumina support material. The coated carriers were dried and calcined to produce catalyst carriers bearing 1.2 grams per cubic inch of catalytic material having 38 grams per cubic foot platinum. One coated carrier was retained as reference catalyst member R-2, the others were separately dipped into 5 ml solutions of bismuth nitrate containing 0.09 g of bismuth, 0.18 g of bismuth and 0.9 g of bismuth per 100 ml of solution, respectively, to wet the conventional catalyst material with the bismuth salt compounds. The wetted catalyst members were dried and calcined and were designated experimental catalyst members E-2, E-3 and E-4 respectively. The Bi:Pt ratios in catalyst members E-2, E-3 and E-4 were 0.5:1; 1:1; and 6:1, respectively.

The conversion characteristics of reference catalyst member R-2 and the three experimental catalyst members were tested by placing each of them in a flow reactor at 115,000/hr GHSV using a test gas stream comprising 85 ppm CO in 10 % $O_2$ and 10 % steam to produce a test gas stream designated gas stream A. Another gas stream designated gas stream B, was the same as A except that the CO was increased to about 510 ppm and the steam contained 80 ppm $SO_2$. The $SO_2$ conversion rate for both gas streams was measured and recorded for each catalyst member and, in addition, the CO conversion rate characteristic was measured and recorded with respect to gas stream B. The results are set forth in the following TABLE II.

TABLE II

| Bi:Pt Atomic Ratio | Temp. | Gas | Percent Conversion $SO_2$ | CO |
|---|---|---|---|---|
| E-2 0.5:1 | 332° C. | A | 9.6 | >90 |
| E-3 1:1 | 330° C. | A | 9.4 | >90 |
| E-4 6:1 | 333° C. | A | 4.9 | >90 |
| R-2 None | 334° C. | A | 14.2 | >90 |
| E-2 0.5:1 | 332° C. | B | 19.3 | 94.6 |
| E-3 1:1 | 333° C. | B | 16.7 | 93.1 |
| E-4 6:1 | 333° C. | B | 11.8 | 91.4 |
| R-2 None | 334° C. | B | 22.2 | 94.8 |

The data of TABLE II show that the addition of the bismuth component to a conventional catalytic material comprising platinum dispersed on an alumina support material yielded oxidation catalysts in which the rate of conversion of $SO_2$ to $SO_3$ was significantly reduced relative to a reference catalytic material that did not comprise bismuth. The CO conversion rate data for gas stream B illustrate that, as indicated above, increasing the bismuth component may have a mild suppressive effect on CO conversion. It may therefore be appropriate in some situations to balance the need to maintain CO conversion with the need to suppress the formation of $SO_3$.

EXAMPLE 3

A comparative catalyst composition was prepared by adding 365 grams Tyzor® LA, a water-based organic titania compound from E.I. du Pont de Nemours & Co. containing 14.2 percent $TiO_2$ to 410 grams of silica. The two were mixed for one hour followed by drying and calcining at 700° C. The resulting powder was impregnated with a platinumammine salt solution, and the platinum was fixed on the silica by the addition of acetic acid. Water was added to produce a slurry comprising 30 percent solids and the slurry was coated onto a honeycomb having 200 cells per square inch and measuring 3 inches in length and 1.5 inches in diameter to give a platinum loading of 38 grams platinum per cubic foot. The coated honeycomb was dried and calcined at 500° C. This comparative catalyst is designated R-3.

An experimental catalyst was prepared by mixing Tyzor LA with silica to produce a support material comprising 18 percent TiO$_2$, balance silica. A bismuth nitrate solution was added to the titania-silica mixture in an amount to provide 4 percent Bi$_2$O$_3$. Platinum was deposited on the resulting support material as described above for comparative catalyst R-3, and the resulting catalytic material was deposited on a 200 cpsi honeycomb carrier with a loading of 38 grams of platinum per cubic foot. This catalyst is designated E-5.

Catalysts R-3 and E-5 were tested fresh for carbon monoxide oxidation at several temperatures using a test gas stream comprising 250 ppm CO, 200 ppm SO$_2$ at a GHSV of 500,000 hr$^{-1}$. The carbon monoxide conversion rate was measured at various temperatures and the results were set forth below in TABLE III.

TABLE III

| | Bi$_2$O$_3$ | Light-Off | % CO Conversion at Temp. (C.) | | | |
|---|---|---|---|---|---|---|
| | Wt % | T (C) | 100° C. | 150° C. | 200° C. | 250° C. |
| E-5 | 2% | 200 | 0 | 20 | 45 | 53 |
| R-3 | None | 220 | 0 | 15 | 47 | 50 |

The data in TABLE III show that the light-off temperature and the low-temperature conversion rates of a platinum-containing catalyst are not substantially affected by the inclusion of bismuth in accordance with the present invention.

While the invention has been described in detail with respect to specific preferred embodiments thereof, it is to be understood that upon a reading of the foregoing desciption, variations to the specific embodiments disclosed may occur to those skilled in the art and it is intended to include such variations within the scope of the appended claims.

What is claimed is:

1. A method for catalytically oxidizing carbon monoxide in a waste or exhaust gas stream containing carbon monoxide and oxidizable sulfur compounds, the method comprising contacting the gas stream under oxidizing conditions with a catalytic material comprising:
    a) a refractory inorganic oxide support material,
    b) a platinum component in the amount, calculated as the metal, of about 0.2 to about 6 percent by weight of the catalytic material and dispersed on the support material in an amount effective to catalyze the oxidation of carbon monoxide, and
    c) a bismuth component in the amount, calculated as the metal, of about 0.1 to about 6 percent by weight of the catalytic material and dispersed on the support material in an amount sufficient to inhibit the oxidation of SO$_2$ to SO$_3$.

2. The method of claim 1 wherein the bismuth component comprises Bi$_2$O$_3$.

3. The method of claim 1 wherein the refractory inorganic oxide support material is selected from the group consisting of alumina, silica, titanium-treated silica, zirconium-treated silica, titania, zirconia and mixtures thereof.

4. The method of claim 1, claim 2 or claim 3 wherein the catalytic material is substantially vanadium-free.

5. The method of claim 1 wherein the platinum and bismuth components are present in amounts sufficient to provide a bismuth-to-platinum atomic molar ratio in the range of from about 0.1:1 to 6:1.

6. The method of claim 5 wherein the platinum and bismuth components are present in amounts sufficient to provide a bismuth-to-platinum atomic molar ratio of from about 0.5:1 to 3:1.

7. The method of claim 6 wherein the platinum and bismuth components are present in amounts that provide a bismuth-to-platinum atomic molar ratio of about 1:1.

8. The method of claim 1, claim 2 or claim 6 wherein the gas stream comprises the exhaust from a diesel engine.

* * * * *